US011216371B2

United States Patent
Yamaguchi

(10) Patent No.: US 11,216,371 B2
(45) Date of Patent: Jan. 4, 2022

(54) CACHE MEMORY AND METHOD FOR CONTROLLING THE SAME

(71) Applicant: Mitsubishi Electric Corporation, Tokyo (JP)

(72) Inventor: Keita Yamaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/480,123

(22) PCT Filed: Mar. 27, 2017

(86) PCT No.: PCT/JP2017/012355
§ 371 (c)(1),
(2) Date: Jul. 23, 2019

(87) PCT Pub. No.: WO2018/179044
PCT Pub. Date: Oct. 4, 2018

(65) Prior Publication Data
US 2020/0019499 A1  Jan. 16, 2020

(51) Int. Cl.
*G06F 12/06* (2006.01)
*G06F 12/10* (2016.01)

(52) U.S. Cl.
CPC .......... *G06F 12/0646* (2013.01); *G06F 12/10* (2013.01); *G06F 2212/1041* (2013.01)

(58) Field of Classification Search
CPC ...... G06F 12/0646; G06F 12/10; G06F 12/12; G06F 2212/1041
See application file for complete search history.

(56) References Cited

U.S. PATENT DOCUMENTS 8,250,332 B2 * 8/2012 Plondke ................ G06F 12/127
 711/153
10,296,457 B2 * 5/2019 Sasanka .............. G06F 12/0811
(Continued)

FOREIGN PATENT DOCUMENTS

JP    2001282617 A    10/2001
WO   2010089799 A1    8/2010

OTHER PUBLICATIONS

Asami et al., "Partitioning Cache by Instruction Groups", Information Processing Society of Japan, Symposium on Advanced Computing Systems and Infrastructures (SACSIS2013) collection, May 22, 2013, pp. 65-69.
(Continued)

*Primary Examiner* — Idriss N Alrobaye
*Assistant Examiner* — Richard B Franklin
(74) *Attorney, Agent, or Firm* — Buchanan Ingersoll & Rooney PC

(57) ABSTRACT

In a cache memory, a main unit stores memory address information which is associated with part of data stored in a memory space to be accessed, on a cache line-by-cache line basis. The memory space is divided into a plurality of memory regions. The address generation unit generates a cache memory address from a memory address specified by an external access request, based on a memory region among the plurality of memory regions which is associated with the memory address specified by the access request. A main unit is searched according to the cache memory address, thereby searching and replacing different ranges of cache lines for different memory regions.

8 Claims, 12 Drawing Sheets

(56) References Cited

U.S. PATENT DOCUMENTS

2006/0143396 A1* 6/2006 Cabot .................. G06F 12/126
 711/134
2008/0028151 A1* 1/2008 Hino ................... G06F 12/0893
 711/125

OTHER PUBLICATIONS

International Search Report (PCT/ISA/210) dated May 30, 2017, by the Japan Patent Office as the International Searching Authority for International Application No. PCT/JP2017/012355.
Office Action (Notice of Reasons for Refusal) dated Aug. 18, 2020, by the Japanese Patent Office in corresponding Japanese Patent Application No. 2019-508345 and English translation of the Office Action. (8 pages).

* cited by examiner

FIG.5

| ADDRESS TRANSLATION INFORMATION | REGION R1 | REGION R2 | DEFAULT REGION |
|---|---|---|---|
| START ADDRESS OF MEMORY REGION | START ADDRESS OF REGION R1 | START ADDRESS OF REGION R2 | 0 |
| MEMORY SIZE | SIZE OF REGION R1 | SIZE OF REGION R2 | SIZE OF ENTIRE MEMORY |
| START INDEX OF CACHE LINE ASSOCIATED WITH MEMORY REGION | 8 | 12 | 0 |
| TOTAL NUMBER OF INDICES ASSOCIATED WITH MEMORY REGION | 4 | 4 | 8 |

FIG.6

| MEMORY REGION | INPUT MEMORY ADDRESS MA | | |
|---|---|---|---|
| REGION R1 | TAG : 12bit | INDEX : 2bit | OFFSET : 2bit |
| REGION R2 | TAG : 12bit | INDEX : 2bit | OFFSET : 2bit |
| DEFAULT REGION | TAG : 11bit | INDEX : 3bit | OFFSET : 2bit |

| MEMORY REGION | INDEX OF INPUT MEMORY ADDRESS | | INDEX OF CACHE MEMORY ADDRESS |
|---|---|---|---|
| REGION R1 | [0:3] | → | [8:11] |
| REGION R2 | [0:3] | → | [12:15] |
| DEFAULT REGION | [0:7] | → | [0:7] |

(B)

| CACHE MEMORY ADDRESS CMA | TAG : 14bit | INDEX : 4bit | OFFSET : 2bit |
|---|---|---|---|

FIG.12

| MEMORY REGION | INPUT MEMORY ADDRESS MA | |
|---|---|---|
| REGION R1 | TAG : 14bit | OFFSET : 2bit |
| REGION R2 | TAG : 14bit | OFFSET : 2bit |
| DEFAULT REGION | TAG : 14bit | OFFSET : 2bit |

| MEMORY REGION | ADDITIONAL INFORMATION FOR CACHE MEMORY ADDRESS |
|---|---|
| REGION R1 | [8], [11] |
| REGION R2 | [12], [15] |
| DEFAULT REGION | [0], [7] |

(B) CACHE MEMORY ADDRESS CMA

| TAG : 14bit | ADDITIONAL INFORMATION : 8bit | OFFSET : 2bit |
|---|---|---|

FIG.15
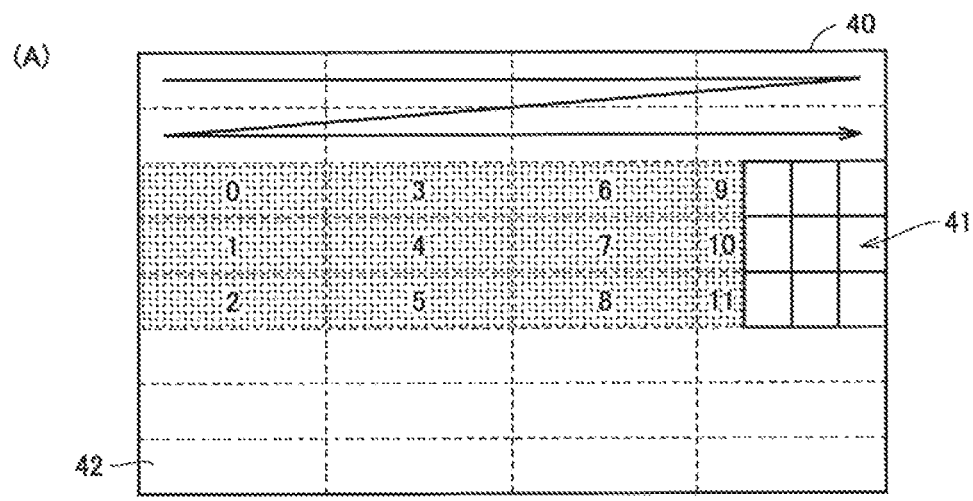
(A)
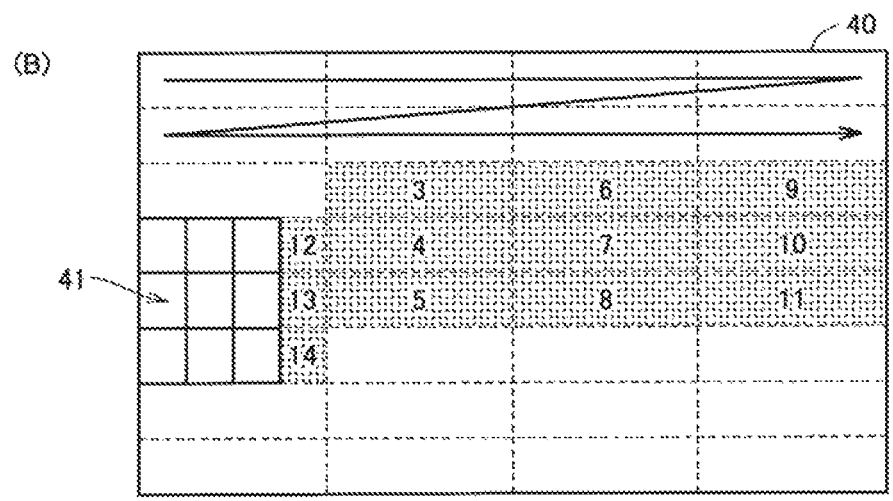
(B)

CACHE MEMORY AND METHOD FOR CONTROLLING THE SAME

TECHNICAL FIELD

The present disclosure relates to a cache memory and a method for controlling the same.

BACKGROUND ART

The processing speed for memory access is slower than the operating speed of a processor, and the delay time in memory access is thus a bottleneck for the performance of the processor. In order to hide the delay time in memory access, a small-capacity, high-speed memory, called a cache memory, is used which stores data having high reusability. Cache memory stores data per unit called a line. Mapping schemes for associating a memory address and a line in a cache memory are classified into direct mapping, set-associative mapping, fully associative mapping, etc.

On a cache miss, data stored in a cache line is replaced with data in a memory device. As a method for this replacement, an algorithm referred to as LRU (Least Recently Used) is generally used. The LRU is a method in which data stored in the least recently used line is first replaced with data in a memory device.

By the way, in applications for scientific computing and image processing, etc., data is sequentially processed and data reusability is thus low. The data replacement by LRU is performed irrespective of the reusability of data. Thus, if the access frequency of data having low reusability is higher than the access frequency of data having high reusability, a cache line storing the data having high reusability may end up being replaced with data that has low reusability. As a result, the cache efficiency decreases.

NPL 1 (Asami, and 4 others, SACSIS2013 collection, pp. 65-69) proposes an approach to use cache partitioning to improve the cache efficiency. Specifically, a concept of an instruction group, which is a collection of memory access instruction groups, is introduced, thereby restricting cache regions available for each instruction group.

CITATION LIST

Non Patent Literature

NPL 1: Asami, and 4 others, "Partitioning Cache by Instruction Groups," Information Processing Society of Japan, Symposium on Advanced Computing Systems and Infrastructures (SACSIS2013) collection, May 22, 2013, pp. 65-69

SUMMARY OF INVENTION

Technical Problem

An object of the present disclosure is to provide a cache memory and a method for controlling the same, which can inhibit a cache line storing data having high reusability from being replaced with data having low reusability. Unlike NPL 1, the cache memory control method according to the present disclosure does not make use of the concept of the instruction group. Accordingly, the technology of the present disclosure is even applicable to cases to which the technology of NPL 1 is difficult to apply.

Solution to Problem

A cache memory according to one embodiment includes a main unit and an address generation unit. The main unit stores a copy of part of data stored in the memory space to be accessed and memory address information that is associated with the part of the data, on a cache line-by-cache line basis. The memory space is divided into a plurality of memory regions. The address generation unit generates a cache memory address from a memory address specified by an external access request, based on a memory region among the plurality of memory regions which is associated with the memory address specified by the access request. The main unit is searched according to the cache memory address, thereby searching and replacing different ranges of cache lines for different memory regions.

Advantageous Effects of Invention

According to the above embodiment, separating memory regions storing data having high reusability from memory regions storing the other data can also separate cache lines that are used for data having high reusability from the other cache lines. As a result, a cache line storing data having high reusability can be inhibited from being replaced with data having low reusability.

BRIEF DESCRIPTION OF DRAWINGS

FIG. 5 is a diagram showing a specific example of the address translation information indicated in FIG. 3.

FIG. 6 is a diagram showing in a tabular format a result of determination of bit lengths of a tag, index, and offset of an input memory address in the example shown in FIG. 3.

FIG. 7 is a diagram for illustrating translation of the index portion of the input memory address in the example shown in FIG. 3.

FIG. 12 is a diagram showing bit lengths of a tag and offset of an input memory address in the example shown in FIG. 3.

FIG. 13 is a diagram for illustrating additional information added to the input memory address in the example shown in FIG. 3.

FIG. 15 is a diagram for illustrating a filtering operation.

DESCRIPTION OF EMBODIMENTS

Figure 1:
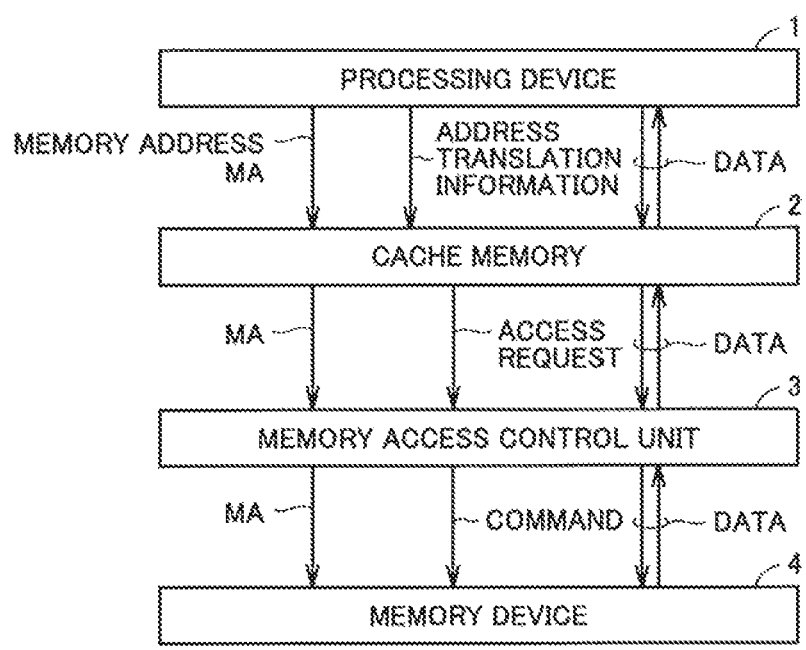
FIG. 1 is a block diagram showing one example configuration of an information processing apparatus in which a cache memory according to Embodiment 1 is implemented.

Hereinafter, embodiments will be described in detail, with reference to the accompanying drawings. Note that like reference signs refer to like or corresponding parts and the description thereof will not be repeated.

[Mapping Schemes of Cache Memory]

Initially, mapping schemes of cache memories will be briefly described. Representative mapping schemes include fully associative mapping, direct mapping, and set-associative mapping.

In the following description, a memory address has a 16-bit length and is associated with 1-byte data, that is, byte addressing is supported. The cache memory includes 4-bit lines (=16), and has a line size of 4 bytes. In other words, each line is associated with four (=2-bit) memory addresses. Note that the above numeric values, etc. are by way of example, and the present disclosure is not limited thereto. Word addressing may be supported, instead of byte addressing.

First, in fully associative mapping, data having any memory address can be stored in any cache line. Specifically, for the numerical example above, each memory address includes a tag in upper 14 bits and an offset in lower 2 bits. Each line in the cache memory is provided with a tag storage storing a tag included in a memory address, and a data storage storing 4-byte line data associated with the tag. The offset having a 2-bit length is used to specify data in the line data, the data being associated with a memory address to be searched.

In the case of the fully associative mapping above, data can be stored in any line available in a cache memory. Thus, the hit rate is high, as compared to the other mapping schemes. However, in reading data, the tag portion of a memory address has to be compared with tag storages of all cache lines. A content addressable memory (CAM) needs to be implemented to perform the tag comparison quickly, which increases the circuit size. Moreover, on a cache miss, the least recently used (LRU) line data is replaced.

Next, the direct mapping limits the number of cache lines that can store data to one cache line for each memory address. Specifically, for the numerical example above, each memory address includes a tag in upper 10 bits, an index in middle 4 bits, and an offset in lower 2 bits. The index having a 4-bit length specifies a cache line that can store data. The cache memory is provided with a tag storage storing the tag of the memory address, and a data storage storing 4-byte line data.

In reading data in the above cache memory employing the direct mapping, the tag storage of one cache line identified by the index portion of a memory address is compared with the tag portion of the memory address. Accordingly, the data comparison may be performed only once. However, the hit rate is low and the cache line is frequently replaced.

The set-associative mapping is an intermediate scheme between the fully associative mapping and the direct mapping. The set-associative mapping is different from the direct mapping in that multiple cache lines are provided for each index. The number of cache lines for each index will be referred to as a way. For example, n-way set associative indicates that data can be stored in n cache lines for each address.

In reading data in the above cache memory employing the set-associative mapping, tag storages in n ways which are associated with the index portion of a memory address are compared with the tag of the memory address. Accordingly, data comparison is performed up to n times. On a cache miss, among n ways associated with the index portion of the memory address, data that is stored in the LRU way is replaced.

[Features of Cache Memory Control Method According to the Present Disclosure]

In the cache memory according to the present disclosure, the memory space of memory device 4 to be accessed is divided into multiple regions. The cache memory is then controlled so that different regions of the cache memory (specifically, an index identifying a cache line) are used for different regions of the memory space. This can separate regions of the cache memory where data having high reusability are stored and regions of the cache memory where data having low reusability are stored. As a result, a cache line storing data that has high reusability and low access frequency can be prevented from being replaced with data that has low reusability, thereby enhancing the cache efficiency.

The above cache memory control method is applicable to any of the set-associative mapping, the direct mapping, and the fully associative mapping. In the following, Embodiment 1 will be described with reference to applying the control method according to the present disclosure to a cache memory that employs the set-associative mapping. Embodiment 2 will be described with reference to applying the control method according to the present disclosure to a cache memory that employs the direct mapping. Embodiment 3 will be described with reference to applying the control method according to the present disclosure to a cache memory that employs the fully associative mapping.

Embodiment 1

[One Example of Information Processing Apparatus]

FIG. 1 is a block diagram showing one example configuration of an information processing apparatus in which a cache memory according to Embodiment 1 is implemented. The configuration of the information processing apparatus of FIG. 1 is also applicable to Embodiments 2 and 3. Referring to FIG. 1, the information processing apparatus includes a processing device 1, a cache memory 2, a memory access control unit 3, and a memory device 4.

Processing device 1 may be a part of a processor for executing programmed instructions, or a circuit that is built using an ASIC (Application Specific Integrated Circuit) or a FPGA (Field Programmable Gate Array).

Memory device 4 holds data for processing by processing device 1. Memory device 4 corresponds to a main memory of a microcomputer. Memory device 4 is configured of a general-purpose DRAM (Dynamic Random Access Memory), for example.

Cache memory 2 is a high-speed memory provided to hide the latency in access to memory device 4 that is slow as compared to processing device 1. Cache memory 2 is configured of an SRAM (Static Random Access Memory), for example.

As cache memory 2 receives from processing device 1 an access request to one memory address, cache memory 2 returns an access response back to processing device 1 if a copy of data at the memory address is placed in cache memory 2. On the other hand, if a copy of the data at the memory address is not placed in cache memory 2, cache memory 2 issues an access request to memory device 4.

When the access request is issued from cache memory 2, memory access control unit 3 converts the access request into a command according to a protocol of memory device 4, and outputs the command to memory device 4. Accordingly, memory access control unit 3 executes data acquisition or the like on memory device 4, and outputs data, etc. to cache memory 2 based on a result of the execution.

As cache memory 2 obtains data associated with a cache-missed memory address from memory device 4 via memory access control unit 3, cache memory 2 replaces data in the LRU cache line and the memory address information that is associated with the data in the LRU cache line, with the obtained data, at which time the data to be replaced is written to memory device 4, that is, what is called a write-back operation is performed. Cache memory 2 outputs to processing device 1 the data obtained from memory device 4.

Note that the configuration of the information processing apparatus of FIG. 1 is by way of example, and the present disclosure is not limited thereto. For example, multiple processing devices 1, cache memories 2, memory access control units 3, and memory devices 4 may be provided. Cache memory 2 may be configured hierarchically.

[Schematic Configuration of Cache Memory]

Figure 2:
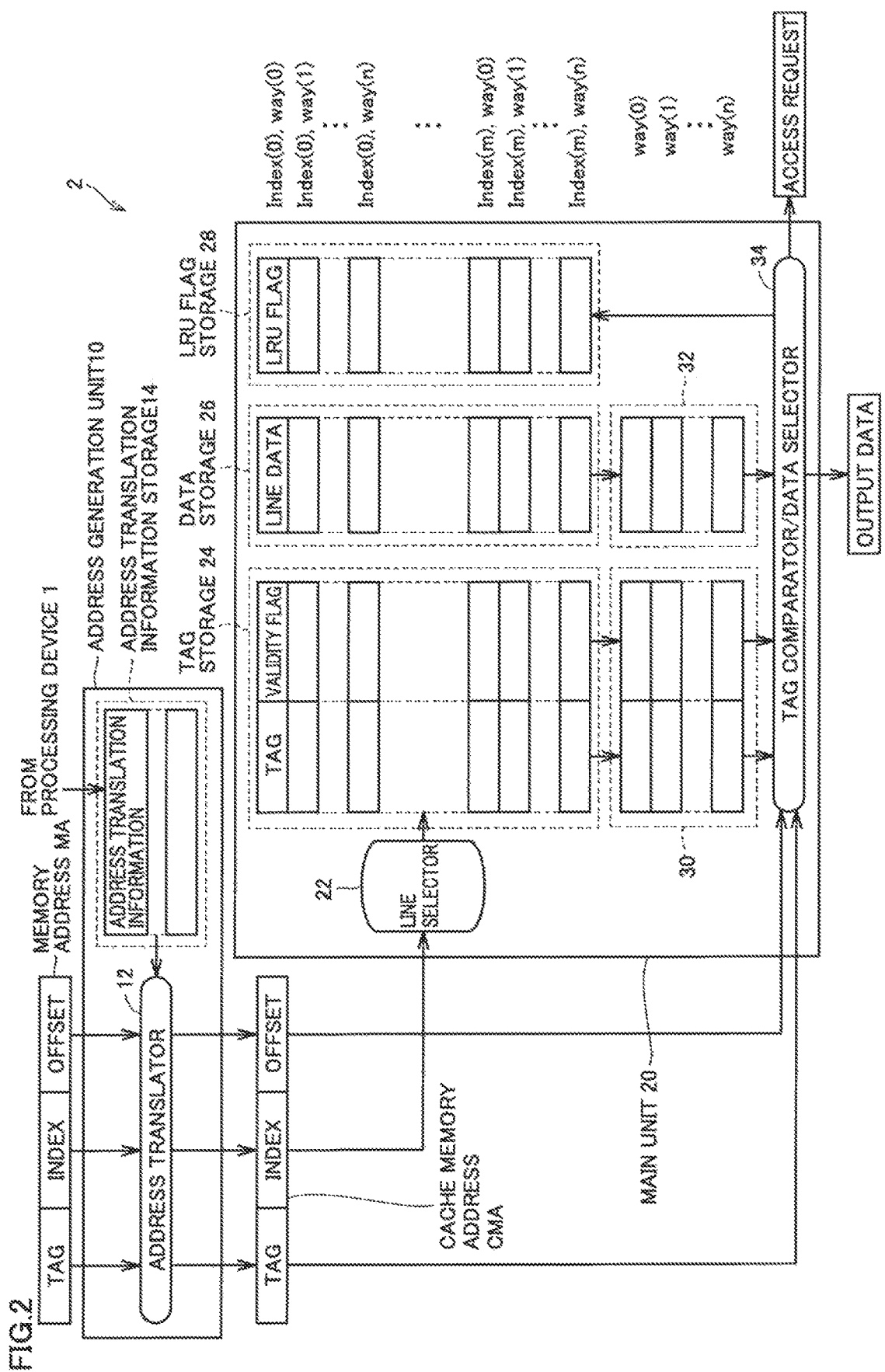
FIG. 2 is a block diagram showing one example configuration of the cache memory according to Embodiment 1.

FIG. 2 is a block diagram showing one example configuration of the cache memory according to Embodiment 1. The mapping scheme of cache memory 2 of FIG. 2 is set-associative mapping. Numbers representing indices are 0 to m, and numbers representing ways that are associated with each index are 0 to n. In FIG. 2, primarily, a flow of data, when a read instruction is issued by processing device 1, is indicated by the arrows.

Referring to FIG. 2, cache memory 2 includes an address generation unit 10 and a main unit 20. Main unit 20 stores a copy of part of data stored in the memory space of memory device 4 to be accessed and memory address information associated with the part of the data, on a cache line-by-cache line basis. Here, the memory space is divided into multiple memory regions, and different memory regions are associated with different ranges of cache lines.

Address generation unit 10 generates a cache memory address CMA from a memory address MA specified by an access request from processing device 1 of FIG. 1, for example. Main unit 20 is searched according to the generated cache memory address CMA, thereby searching and replacing different ranges of cache lines for different memory regions.

More specifically, address generation unit 10 includes an address translation information storage 14 and an address translator 12. Address translator 12 generates cache memory address CMA from input memory address MA by referring to address translation information stored in address translation information storage 14. The address translation information is rewritable by processing device 1, etc.

Main unit 20 includes a tag storage 24, a data storage 26, an LRU flag storage 28, a line selector 22, a selected tag storage 30, a selected data storage 32, and tag comparator/data selector 34.

In the following, an operation of each of the above elements will be described.

[Address Translation Information Storage]

Figure 3:
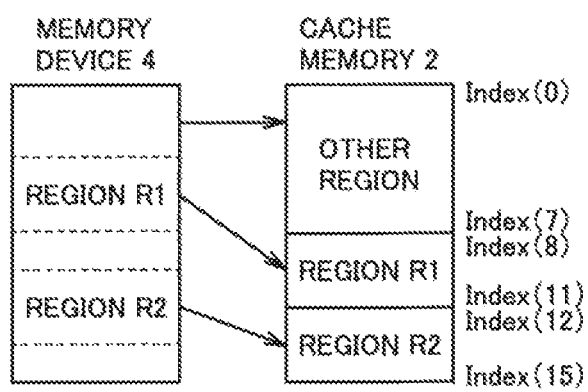
FIG. 3 is a diagram for illustrating association between multiple memory regions in a memory space and cache lines.

FIG. 3 is a diagram for illustrating association between multiple memory regions of the memory space and cache lines. Note that, by way of example, cache memory 2 includes 16 indices (i.e., m=15 in FIG. 2). In the set-associative mapping, multiple ways are provided for each index (n+1 ways, which are way (0) to way (n) in the example of FIG. 2).

Initially, the memory space of memory device 4 to be accessed is divided into multiple memory regions. In the specific example of FIG. 3, the memory space of memory device 4 is divided into a memory region R1, a memory region R2, and the other memory region.

Regarding cache memory 2, different ranges of cache lines are associated with the different memory regions above. In the specific example of FIG. 3, memory region R1 is associated with indices 8 to 11 in the cache memory. For example, when there is an access request to a memory address MA associated with memory region R1, a cache line having an index among indices 8 to 11 in the cache memory that is associated with memory region R1 is to be searched. Similarly, memory region R2 is associated with indices 12 to 15 in the cache memory. The other memory regions are associated with indices 0 to 7 in the cache memory.

In the above, for example, data having high reusability and low access frequency are stored into memory regions R1, R2 of memory device 4, and the other data having low reusability are stored into the other memory region. Doing so also separates the usage areas of the cache memory according to the reusability of data, thereby enhancing the cache efficiency.

Figure 4:
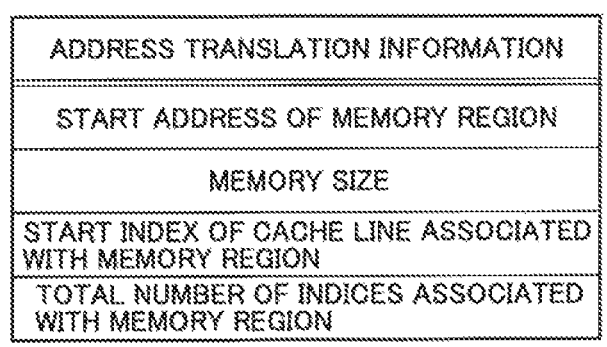
FIG. 4 is a diagram for illustrating address translation information.

FIG. 4 is a diagram for illustrating the address translation information. Referring to FIG. 4, the address translation information is generated by, for example, processing device 1 of FIG. 1, for each memory region described with reference to FIG. 3, and the address translation information is stored into address translation information storage 14 of FIG. 2. Specifically, the address translation information includes a start address of a memory region, a memory size of the memory region, the start index of a cache line associated with the memory region, and a total number of indices included in the cache line associated with the memory region. If the above address translation information (i.e., cache memory assignment configuration) depends on an application to be executed, processing device 1 rewrites the address translation information beforehand according to an application to be executed.

FIG. 5 is a diagram showing a specific example of the address translation information indicated in FIG. 3. Referring to FIGS. 3 and 5, the start index of a cache line associated with memory region R1 is 8, and a total number of indices associated with memory region R1 is four. The start index of a cache line associated with memory region R2 is 12, and a total number of indices associated with memory region R2 is four.

In FIG. 5, the regions other than regions R1 and R2 are a default region representing the entirety of the memory other than regions R1 and R2. The start index of a cache line associated with the default region is 0, and a total number of indices associated with the default region is eight.

[Address Translator]

Referring to FIG. 2, address translator 12 generates a cache memory address CMA from input memory address MA by referring to the address translation information stored in address translation information storage 14.

Here, in the set-associative mapping, the memory address MA and cache memory address CMA each include a tag in upper bits, an index in middle bits, and an offset in lower bits. The bit length of the offset depends on a line size of the cache memory. In the following description, by way of example, the line size is 4 bytes for byte addressing. In this case, the offset has a 2-bit length. Additionally, in the following description, memory address MA has a 16-bit length, and a total number of indices for the entirety of the cache memory is 16 (=4 bits).

In the following, an operation of the address translator in the specific example shown in FIGS. 3 and 5 is described. Address translator 12 generates cache memory address CMA from input memory address MA, according to the following procedures 1 through 3:

(Procedure 1)

Address translator 12 determines a memory region with which input memory address MA is associated, by referring to the start address and memory size of each of the memory regions included in the address translation information stored in address translation information storage 14. In the example of FIG. 3, address translator 12 determines whether input memory address MA is associated with memory region R1 or memory region R2 in the listed order, and, if input memory address MA is associated with none of memory region R1 and memory region R2, address translator 12 determines input memory address MA to be associated with the default region indicating the entirety of the memory other than regions R1 and R2.

(Procedure 2)

Next, address translator 12 determines the bit length of the tag and the bit length of the index of input memory address MA by referring to address translation information storage 14 for a total number of indices included in a cache line that is associated with the memory region determined by procedure 1. Note that the offset has a 2-bit length and the memory address MA has a 16-bit length. The bit length of the offset is a fixed value depending on a line size, and the bit length of the memory address MA is a fixed value depending on hardware restrictions, etc.

FIG. 6 is a diagram showing in a tabular format a result of the determination of the bit lengths of the tag, index, and offset of the input memory address MA in the example shown in FIG. 3.

Referring to FIG. 6 and FIG. 5 showing the address translation information, a total number of indices included in a cache line that is associated with memory region R1 is four (=2 bits). Thus, the tag has a 12-bit length (i.e., 16−2−2=12), the index has a 2-bit length, and the offset has a 2-bit length.

Similarly, a total number of indices included in a cache line that is associated with memory region R2 is four (=2 bits). Thus, the tag has a 12-bit length, the index has a 2-bit length, and the offset has a 2-bit length.

A total number of indices included in a cache line that is associated with the default region is eight (=3 bits). Thus, the tag has an 11-bit length (i.e., 16−3−2=11), the index has a 3-bit length, and the offset has a 2-bit length.

(Procedure 3)

Next, address translator 12 generates the tag, index, and offset of the cache memory address CMA by referring to address translation information storage 14 for the start index of the cache line that is associated with the memory region determined by procedure 1. Specifically, while the tag and offset of cache memory address CMA each have the same value as that of input memory address MA, the value of the index of cache memory address CMA is translated from the value of the index of input memory address MA. Note that the bit length of the index of cache memory address CMA is equal to 4 bits (=16) which is a total number of indices for the entirety of the cache memory.

FIG. 7 is a diagram for illustrating the translation of the index portion of input memory address MA in the example shown in FIG. 3.

Referring to (A) of FIG. 7 and FIG. 5 showing the address translation information, the start index of the cache line associated with memory region R1 is 8, and the 2-bit indices, which are 0 to 3 ("00" to "11" in binary number) of input memory address MA, are thus translated into 4-bit indices which are 8 to 11 ("1000" to "1011" in binary number), respectively. In other words, indices for cache memory address CMA are generated by adding 8 ("1000" in binary number) to the indices of input memory address MA.

The start index for the cache line associated with memory region R2 is 12. Thus, the 2-bit indices, which are 0 to 3 ("00" to "11" in binary number) of input memory address MA, are translated into 4-bit indices which are 12 to 15 ("1100" to "1111" in binary number), respectively. In other words, indices for cache memory address CMA are generated by adding 12 ("1100" in binary number) to the indices of input memory address MA.

The start index of the cache line associated with the default region is 0. Thus, the 3-bit indices, which are 0 to 7 ("000" to "111" in binary number) of input memory address MA, are translated into 4-bit indices which are 0 to 7 ("0000" to "0111" in binary number), respectively. In other words, the values of indices of cache memory address CMA are equal to the values of the indices of input memory address MA.

Referring to (B) of FIG. 7, regarding the bit length of cache memory address CMA according to the present embodiment, the bit length of the tag portion is set to 14 bits, the bit length of the index portion is set to 4 bits, and the bit length of the offset portion is set to 2 bits. The bit length of the offset portion is a fixed value depending on a line size. The bit length of the tag portion and the bit length of the index portion are each set to the maximum values that they can be, considering the case where the total number of indices of cache memory 2 are changed.

Assuming, for example, that the maximum value of the total number of indices according to a cache memory size is 16 (4 bits), the total number of indices of cache memory 2 can be 16, 8, 4, 2, and 1. When the total number of indices is 16, the number of bits of the index portion is 4 bits, and the number of bits of the tag portion is 10 bits. Similarly, when the total number of indices is 8, 4, 2, and 1, the number of bits of the index portion is 3, 2, 1, and 0 bit, respectively, and the number of bits of the tag portion is 11, 12, 13, and 14 bits, respectively. Accordingly, the maximum number of bits of the index portion is 4 bits, and the maximum number of bits of the tag portion is 14 bits.

To translate the memory address MA shown in FIG. 6 to cache memory address CMA, note that the bit length of the tag portion associated with the default region is translated from 11 bits to 14 bits by adding in binary number "000" to the start of the tag portion. The bit length of the tag portion associated with region R1, R2 is translated from 12 bits to 14 bits by adding in binary number "00" to the start of the tag portion.

[Tag Storage]

Tag storage 24 stores tags and validity flags. A validity flag indicates whether a line is valid or not. A validity flag is disabled in the initial state, and is rewritten to be enabled as data and memory address information are written from the memory device.

[Data Storage]

Data storage 26 stores multiple data corresponding to a tag and an index for each cache line. Specifically, pieces of data corresponding to the number of bits that are included in the offset, are stored in data storage 26.

[LRU Flag Storage]

LRU flag storage 28 stores an LRU flag representing the order of access to a cache line.

[Line Selector]

Line selector 22 selects multiple cache lines which are indicated by the index included in cache memory address CMA, that is, selects n+1 ways, which are way (0) to way (n). The tags and validity flags of the selected multiple lines are stored into selected tag storage 30. Data included in the selected multiple lines are stored into selected data storage 32.

[Tag Comparator/Data Selector]

Tag comparator/data selector 34 compares the tag included in the cache memory address CMA with the tags of the multiple selected lines stored in selected tag storage 30. As a result, on a cache hit (i.e., there is a line whose validity flag is enabled and the tag included in the cache memory address CMA matches a tag of one of the multiple selected lines), tag comparator/data selector 34 selects data based on the offset included in cache memory address CMA. If a read instruction is issued by processing device 1, tag comparator/data selector 34 outputs to processing device 1 the data selected based on the offset, and updates the LRU flag.

When a write instruction is issued by processing device 1 and a cache hit occurs, on the other hand, tag comparator/data selector 34 rewrites data associated with the offset of input memory address MA (the same as the offset of cache memory address CMA) among line data stored in data storage 26 for which a cache hit has occurred. Furthermore, tag comparator/data selector 34 updates the LRU flag.

As a result of the comparison above, when there is no line whose tag matches the tag included in the cache memory address CMA (i.e., a cache miss) and there is a cache line whose validity flag is disabled, tag comparator/data selector 34 reads, from memory device 4, line data that is associated with input memory address MA, stores the tag and validity flag into tag storage 24, stores the data read from memory device 4 into data storage 26, and updates the LRU flag of the line in LRU flag storage 28. In the case of a read instruction, tag comparator/data selector 34 outputs the read data to processing device 1. In the case of a write instruction, on the other hand, tag comparator/data selector 34 rewrites data associated with the offset (the same as the offset of cache memory address CMA) of input memory address MA, in the line data stored in data storage 26.

As a result of the comparison above, when there is no line whose tag matches the tag included in the cache memory address CMA and there is no cache line whose validity flag is disabled (i.e., when all validity flags are enabled), tag comparator/data selector 34 selects the least recently used (i.e., LRU) line, and writes line data of this LRU line to memory device 4 (i.e., performs write-back operation). Next, tag comparator/data selector 34 reads line data associated with input memory address MA from memory device 4, stores the tag and validity flag into the LRU line in tag storage 24, store the read data into the LRU line of data storage 26, and updates the LRU flag in LRU flag storage 28. In the case of a read instruction, tag comparator/data selector 34 outputs data associated with the offset of input memory address MA to processing device 1. In the case of a write instruction, on the other hand, tag comparator/data selector 34 rewrites data associated with the offset of input memory address MA (the same as the offset of cache memory address CMA), in the line data stored in data storage 26.

[Summary of Cache Memory Operation]

Figure 8:
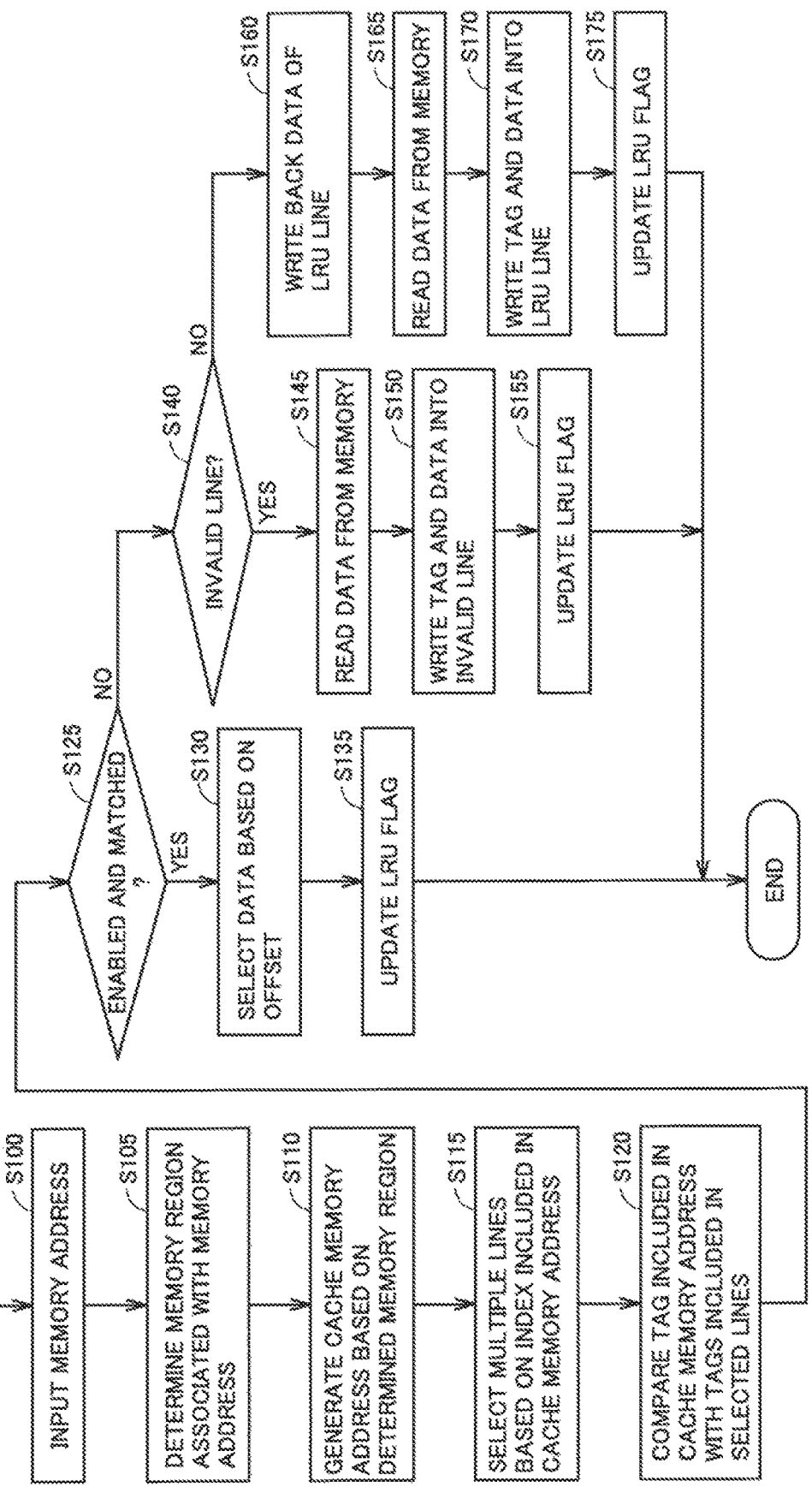
FIG. 8 is a flowchart showing an operation of the cache memory of FIG. 2.

FIG. 8 is a flowchart showing an operation of the cache memory of FIG. 2. In the following, referring primarily to FIGS. 2 and 8, the foregoing description is summarized.

At step S100, memory address MA to be accessed is input to address translator 12. At the next step S105, address translator 12 determines a memory region associated with the input memory address MA, based on the address translation information. At the next step S110, address translator 12 determines the number of bits of the tag, index, and offset of input memory address MA based on the address translation information, and translates the index portion of the input memory address MA based on the address translation information of the memory region associated with the input memory address MA. This generates cache memory address CMA.

At the next step S115, line selector 22 selects multiple cache lines indicated by the index included in cache memory address CMA, that is, selects n+1 ways, which are way (0) to way (n). At the next step S120, tag comparator/data selector 34 compares the tag included in cache memory address CMA with tags of the selected lines.

As a result of the comparison above, if there is a selected line whose validity flag is enabled and tag matches one of the tags included in the selected lines (YES at step S125), tag comparator/data selector 34, at the next step S130, selects data based on the offset included in cache memory address CMA, and performs on the selected data a process according to the access request from processing device 1. Furthermore, at step S135, an LRU flag in the selected line is updated.

As a result of the comparison above, if there is no line whose tag matches the tag included in cache memory address CMA and there is an invalid line (NO at step S125, YES at step S140), tag comparator/data selector 34, at the next step S145, reads line data associated with input memory address MA from memory device 4. At the next step S150, tag comparator/data selector 34 stores the tag and the read data into the invalid line, sets the validity flag enabled, and performs the process according to the access request from processing device 1. Furthermore, at step S155, tag comparator/data selector 34 updates the LRU flag of the cache line.

As a result of the comparison above, if there is no line whose tag matches the tag included in cache memory address CMA and there is no invalid line (NO at step S125, NO at step S140), tag comparator/data selector 34, at the next step S160, selects the least recently used line among the selected lines, and writes the line data of the LRU line back to the memory device. At the next step S165, tag comparator/data selector 34 reads line data associated with input memory address MA from memory device 4. At the next step S170, tag comparator/data selector 34 stores the tag and the read data into the LRU line, sets the validate flag enabled, and performs the process according the access request from processing device 1. Furthermore, at step S175, tag comparator/data selector 34 updates the LRU flag of the cache line.

Advantageous Effects

According to cache memory 2 having the above configuration, lines to be used in the cache memory can be separated, according to a type of data handled by an application. This can separate regions of the cache memory where data having high reusability are stored and regions of the cache memory where data having low reusability are stored. Thus, a cache line storing data having high reusability can be inhibited from being replaced with data having low reusability. As a result, the cache efficiency can be enhanced.

Embodiment 2

Embodiment 2 will be described with reference to the mapping scheme of the cache memory being the direct mapping.

Figure 9:
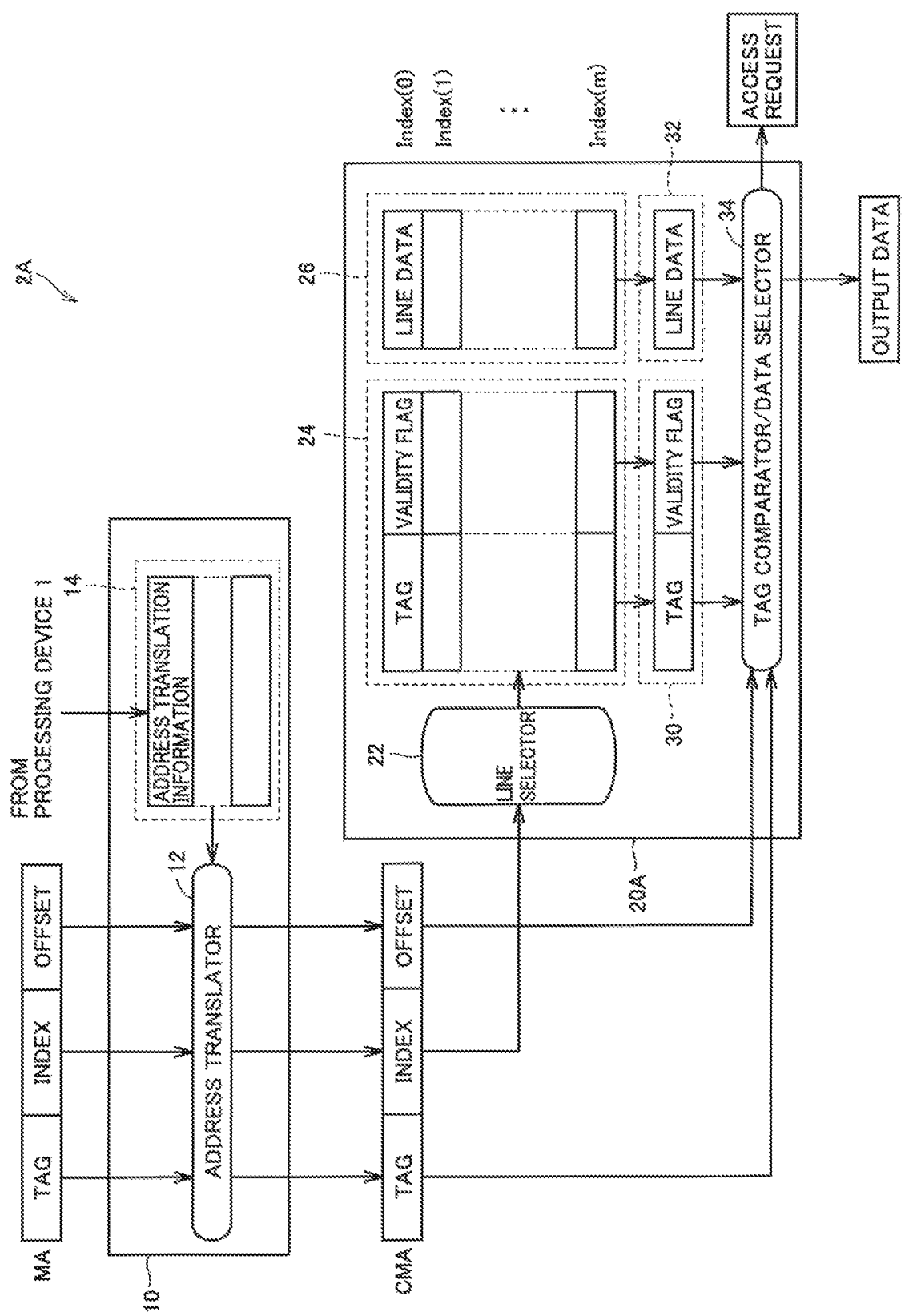
FIG. 9 is a block diagram showing one example configuration of a cache memory according to Embodiment 2.

FIG. 9 is a block diagram showing one example configuration of a cache memory according to Embodiment 2. Cache memory 2A of FIG. 9 is different from cache memory 2 of FIG. 2 with respect to the configuration of main unit 20A. Specifically, cache lines in main unit 20A are not provided with ways associated with respective indices, and, additionally, main unit 20A does not include LRU flag storage 28. The rest of configuration of cache memory 2A of FIG. 9 is the same as cache memory 2 of FIG. 2. Thus, like reference signs refer to like or corresponding parts and the description thereof will not be repeated.

Figure 10:
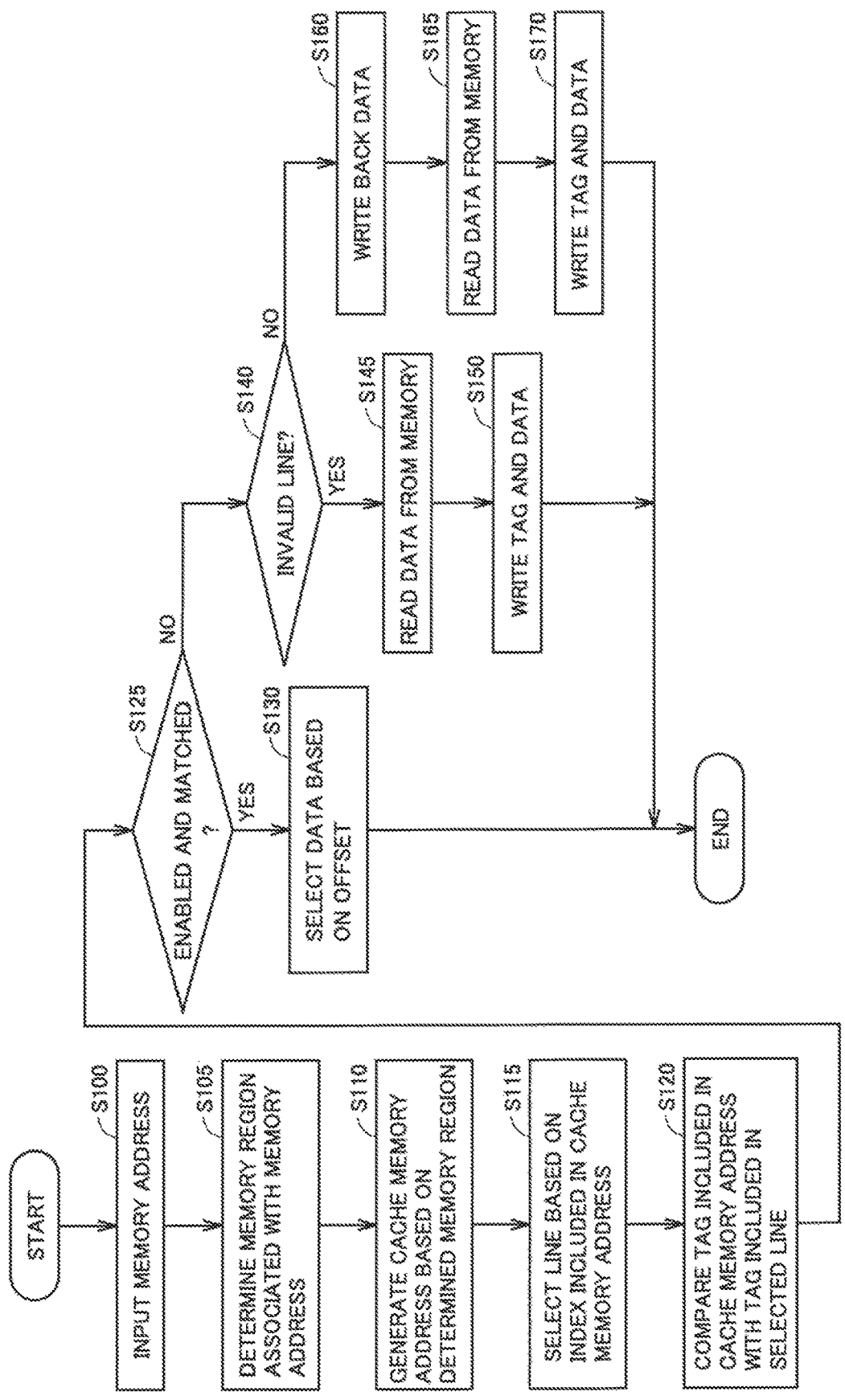
FIG. 10 is a flowchart showing an operation of the cache memory of FIG. 9.

FIG. 10 is a flowchart showing an operation of the cache memory of FIG. 9. In the flowchart of FIG. 9, like reference signs refer to steps like or corresponding to those shown in the flowchart according to Embodiment 1, and the description thereof will not be repeated.

Referring to FIG. 10, at step S110, cache memory address CMA is generated. Regarding the steps before step S110, there is no difference between cache memory 2A employing the direct mapping and cache memory 2 employing the set-associative mapping according to the present embodiment.

At the next step S115, line selector 22 selects a line indicated by the index included in cache memory address CMA. For cache memory 2A employing the direct mapping, the number of the cache line is limited to one. At the next step S120, tag comparator/data selector 34 compares the tag included in cache memory address CMA with the tag of the selected line.

As a result of the comparison above, if the validity flag of the selected line is enabled and the tag included in cache memory address CMA matches the tag of the selected line (YES at step S125), tag comparator/data selector 34, at the next step S130, selects data based on the offset included in cache memory address CMA, and performs on the selected data a process according to an access request from processing device 1.

As a result of the comparison above, if the tag included in cache memory address CMA does not match the tag of the selected line and the validity flag of the selected line is disabled (NO at step S125, YES at step S140), tag comparator/data selector 34, at the next step S145, reads line data that is associated with input memory address MA, from memory device 4. At the next step S150, tag comparator/data selector 34 stores the tag and the read data into the invalid line, sets the validity flag enabled, and performs the process according to the access request from processing device 1.

As a result of the comparison above, if the tag included in cache memory address CMA does not match the tag of the selected line and the validity flag of the selected line is enabled (NO at step S125, NO at step S140), tag comparator/data selector 34, at the next step S160, writes the line data in the selected line back to the memory device. At the next step S65, tag comparator/data selector 34 reads line data that is associated with input memory address MA, from memory device 4. At the next step S170, tag comparator/data selector 34 stores the tag and the read data into the selected line, sets the validity flag enabled, and performs the process according to the access request from processing device 1.

As the above, since the number of selected lines is limited to one in the direct mapping, there is no need to select the LRU line. Accordingly, as a result of comparing the value of the tag included in cache memory address CMA with the value of the tag of the selected line, if the tags do not match (i.e., on a cache miss), the data included in the selected line is replaced.

Cache memory 2A according to Embodiment 2 above can also separate lines to be used in the cache memory, according to a type of data handled by an application. This can separate regions of the cache memory where data having high reusability are stored and regions of the cache memory where data having low reusability are stored. Thus, a cache line storing data having high reusability can be inhibited from being replaced with data having low reusability. As a result, the cache efficiency can be enhanced.

Embodiment 3

[Schematic Configuration of Cache Memory]

Figure 11:
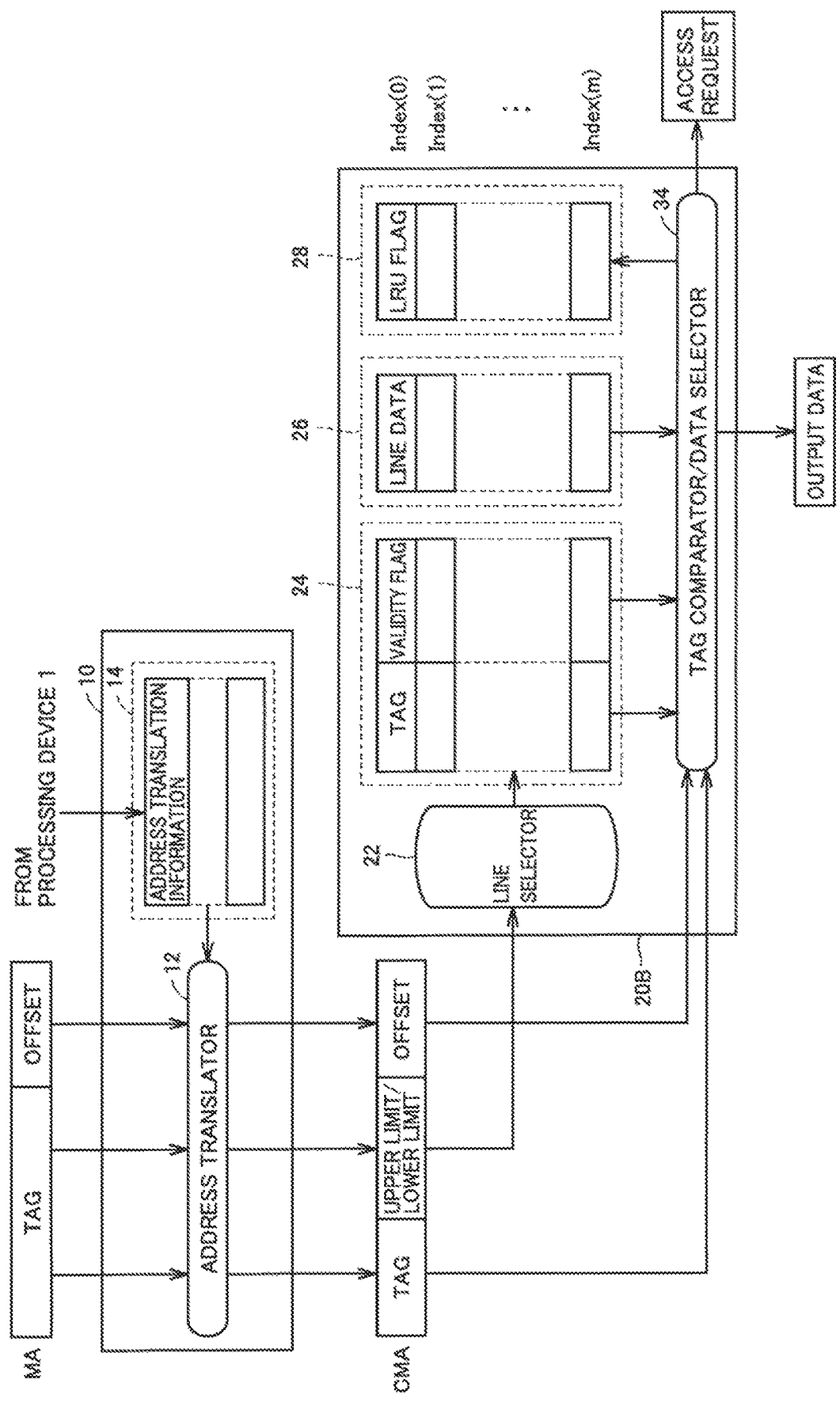
FIG. 11 is a block diagram showing one example configuration of a cache memory according to Embodiment 3.

Embodiment 3 will be described with reference to the mapping scheme of a cache memory being fully associative mapping. FIG. 11 is a block diagram showing one example configuration of a cache memory according to Embodiment 3.

Referring to FIG. 11, in the case of the fully associative mapping, input memory address MA includes a tag in upper bits and an offset in lower bits, and is not provided with an index. Cache memory address CMA translated from input memory address MA by address translator 12 includes additional information corresponding to an index which is added between the tag and the offset. The additional information does not specify one index, but specifies a range of indices (the upper limit and the lower limit). Data and the tag can be stored in any cache line within this index range. This can limit the range of cache lines, according to a memory region to be accessed which is associated with memory address MA, thereby inhibiting a cache line storing data having high reusability from being replaced with data having low reusability.

Cache memory 2B of FIG. 11 is different from Embodiment 1 shown in FIG. 2 in that main unit 20B is not provided with ways. Furthermore, cache memory 2B of FIG. 11 is not provided with selected tag storage 30 and selected data storage 32. The other configurations shown in FIG. 11 are the same as those shown in FIG. 2. Thus, like reference signs refer to like or corresponding parts and the description thereof may not be repeated.

[Operation of Address Translator]

In the following, using the same specific example as Embodiment 1, an operation of address translator 12 will be described. The association between memory regions and cache lines is shown in FIG. 3, and the address translation information is shown in FIG. 5. Memory address MA has a 16-bit length, and a total number of indices for the entirety of the cache memory is 16 (=4 bits) (i.e., m=15 in FIG. 11). The offset has a 2-bit length.

In the above case, address translator 12 generates cache memory address CMA from input memory address MA, according to the following procedures 1 and 2:

(Procedure 1)

Address translator 12 determines a memory region with which input memory address MA is associated, by referring to the start address and memory size of each of the memory regions included in the address translation information stored in address translation information storage 14. In the example of FIG. 3, address translator 12 determines whether input memory address MA is associated with memory region R1 or memory region R2 in the listed order, and, if input memory address MA is associated with none of memory region R1 and memory region R2, address translator 12 determines input memory address MA to be associated with the default region indicating the entirety of the memory other than regions R1 and R2.

FIG. 12 is a diagram showing the bit lengths of the tag and index of input memory address MA in the example shown in FIG. 3. In the case of the fully associative mapping, input memory address MA includes a tag in upper bits and an offset in lower bits. Accordingly, the tag has a 14-bit length and the offset has a 2-bit length, irrespective of the determined memory region.

(Procedure 2)

Next, address translator 12 generates additional information to be added to input memory address MA, by referring to address translation information storage 14 for the start index and a total number of indices of a cache line that is associated with the memory region determined by procedure 1.

FIG. 13 is a diagram for illustrating additional information added to input memory address MA in the example shown in FIG. 3.

Referring to (A) of FIG. 13 and FIG. 5 showing the address translation information, the start index of a cache line associated with memory region R1 is 8, and a total number of indices is four. Thus, 8-bit information ("10001011" in binary number), indicating the index's lower limit being 8 and the upper limit being 11, is generated as additional information.

The start index of a cache line associated with region R2 is 12, and a total number of indices is four. Thus, 8-bit information ("11001111" in binary number), indicating the index's lower limit being 12 and the upper limit being 15, is generated as additional information.

The start index of a cache line associated with the default region is 0, and a total number of indices is eight. Thus, 8-bit information ("00000111" in binary number), indicating the index's lower limit being 0 and the upper limit being 7, is generated as additional information.

Referring to (B) of FIG. 13, the generated 8-bit additional information is placed between the 14-bit tag and the 2-bit offset, thereby generating cache memory address CMA.

[Operation of Cache Memory]

Figure 14:
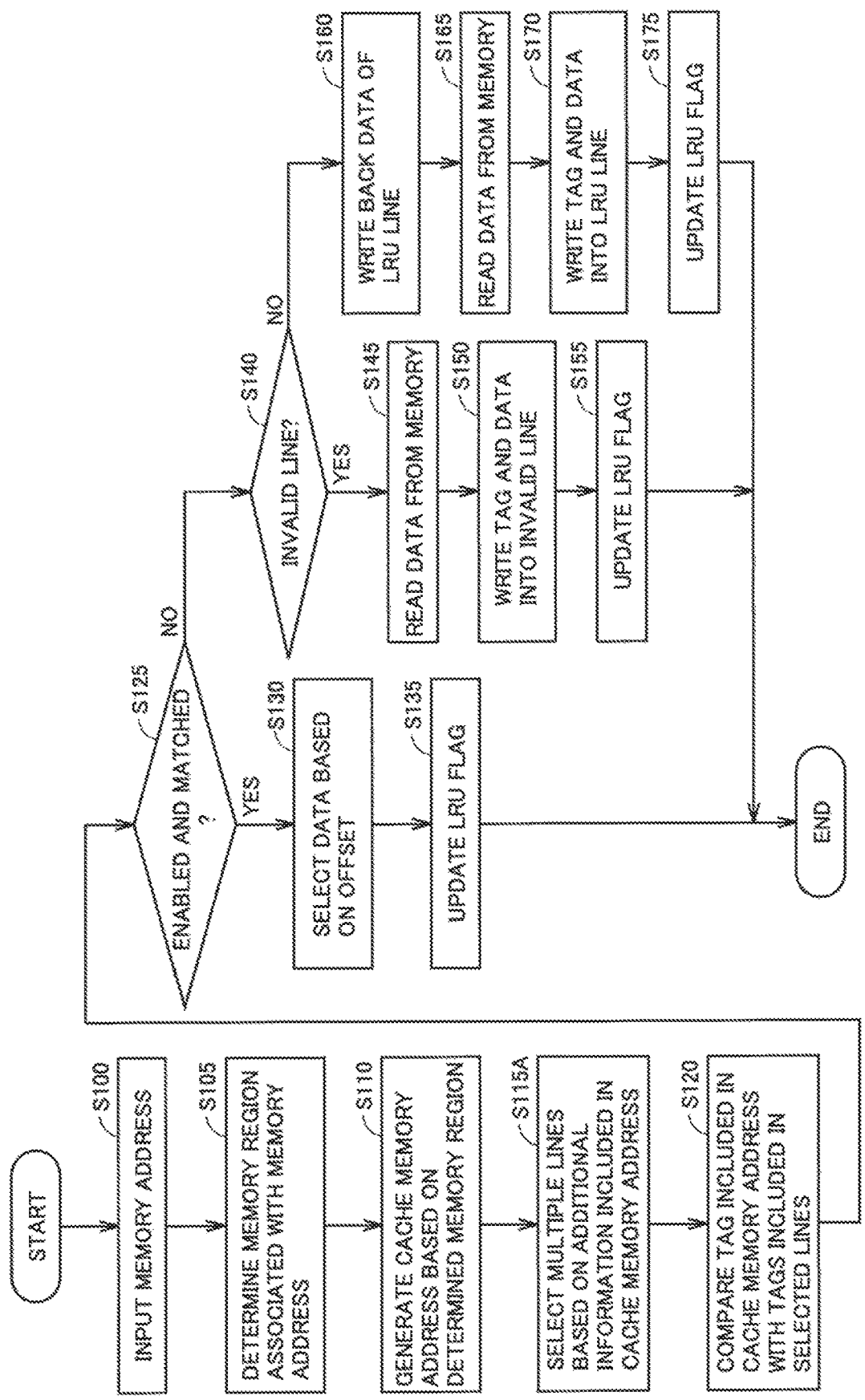
FIG. 14 is a flowchart showing an operation of the cache memory of FIG. 11.

FIG. 14 is a flowchart showing an operation of the cache memory of FIG. 11.

Referring to FIGS. 11 and 14, at step S100, memory address MA to be accessed is input to address translator 12. At the next step S105, address translator 12 determines a memory region associated with the input memory address MA, based on the address translation information. At the next step S110, address translator 12 determines additional information to be added to input memory address MA, based on address translation information associated with the determined memory region. The additional information indicates a range of cache lines that are associated with the determined memory region. The additional information is inserted between the tag and offset of input memory address MA, thereby generating cache memory address CMA.

At the next step S115A, line selector 22 selects multiple cache lines that are within the range from the upper limit to the lower limit indicated by the additional information included in cache memory address CMA. At the next step S120, tag comparator/data selector 34 compares the tag included in cache memory address CMA with a tag of each selected line.

Step S125 and the subsequent steps are the same as those according to Embodiment 1 shown in FIG. 8. Accordingly, like reference signs refer to like or corresponding steps and the description thereof will not be repeated.

Advantageous Effects

Cache memory 2B according to Embodiment 3 above can also separate lines to be used in the cache memory, according to a type of data handled by an application. This can separate regions of the cache memory where data having high reusability are stored and regions of the cache memory where data having low reusability are stored. Thus, a cache line storing data having high reusability can be inhibited from being replaced with data having low reusability. As a result, the cache efficiency can be enhanced.

Embodiment 4

Embodiment 4 will be described with reference to filtering two-dimensional image data by an information processing apparatus which includes cache memory 2B having the configuration according to Embodiment 3.

FIG. 15 is a diagram for illustrating the filtering operation. Referring to FIG. 15, the two-dimensional image data is deployed on a two-dimensional array 40. The address numbers increase from the left to the right, and from the top to the bottom. Four pixels of data which are arranged horizontally and respectively represented by four addresses are stored in a rectangle 42 of FIG. 15.

The filtering averages nine pieces of data 41 which are consisting of three pixels vertically and three pixels horizontally in FIG. 15. Two-dimensional array 40 is filtered, starting from the upper left corner, proceeding from the left to the right. As the processing reaches the right end, data is filtered, starting from one in a pixel at the left end one pixel down, and so on.

Assume that a region of the memory space that is storing the two-dimensional array 40 above is set as one specific memory region. Furthermore, associated with the specific memory region, 12 lines of data region are secured in the cache memory. Each line is storing four pixels worth of data within rectangles 42.

In the above configuration, the filtering proceeds to the right end position of two-dimensional array 40, as shown in (A) of FIG. 15. Here, data in the twelve doted rectangles are stored in the 12 cache lines that are associated with the specific memory regions. The numbers 0 to 11 assigned to the respective dotted regions each represent an LRU flag, indicating a time of access to the cache line. The line data in the cache memory are accessed in the numerical order.

Part (B) of FIG. 15 shows a state at a step following (A) of FIG. 15. As shown in (B) of FIG. 15, the filtering proceeds to one pixel down to the left end. Here, the least recently used line having the LRU flag=0 is selected and data stored in this line is replaced with data that is represented by the LRU flag=14.

As described in Embodiment 3, the 12 cache lines associated with the specific memory region storing the two-dimensional image data are dedicated to filter the two-dimensional array. Thus, these 12 cache lines are not rewritten by data that is used for the other processing. This achieves enhanced cache efficiency.

The presently disclosed embodiments above should be considered illustrative in all aspects and do not limit the present disclosure. The scope of the present disclosure is defined by the appended claims, rather than by the above description. All changes which come within the meaning and range of equivalency of the appended claims are intended to be embraced within their scope.

REFERENCE SIGNS LIST 1 processing device; 2, 2A, 2B cache memory; 3 memory access control unit; 4 memory device; 10 address generation unit; 12 address translator; 14 address translation information storage; 20, 20A, 20B main unit; 22 line selector; 24 tag storage; 26 data storage; 28 flag storage; 30 selected tag storage; 32 selected data storage; 34 tag comparator/data selector; CMA cache memory address; MA memory address; R1, R2 memory region.

The invention claimed is:

1. A cache memory, comprising:
a main unit storing a copy of part of data stored in a memory space to be accessed and a memory address information associated with the part of the data, on a cache line-by-cache line basis, the memory space being divided into a plurality of memory regions, different ranges of cache lines being associated with different memory regions of the plurality of memory regions; and
an address generation unit configured to receive a memory address in the memory space, specified by an external access request, determine which memory region among the plurality of memory regions the received memory address belongs to, and generate a cache memory address from the memory address specified by the external access request, based on the determined memory region, wherein
the main unit is searched according to the cache memory address, thereby searching and replacing different ranges of cache lines for different memory regions.

2. The cache memory according to claim 1, wherein the address generation unit includes:
an address translation information storage storing the address translation information representing association between a range of memory addresses of each of the plurality of memory regions and a range of cache lines; and
an address translator configured to generate the cache memory address by translating a portion of the memory address specified by the external access request or adding additional information to the memory address specified by the external access request, based on the address translation information.

3. The cache memory according to claim 2, wherein a mapping scheme of the cache memory is set-associative mapping or direct mapping,
the memory address includes a tag in upper bits, an index in middle bits, and an offset in lower bits, and
the address translator is configured to generate the cache memory address by translating the index of the memory address specified by the access request, based on the address translation information.

4. The cache memory according to claim 3, wherein the main unit includes:
a data storage storing data on a cache line-by-cache line basis;
a tag storage storing tag information included in a memory address which is associated with the data stored in the data storage;
a line selector configured to select one or more cache lines, based on an index of the cache memory address or the additional information; and
a tag comparator/data selector configured to compare a tag included in the cache memory address and tags of the selected one or more cache lines to determine whether a cache hit has occurred, and, on a cache hit, select data based on an offset of the cache memory address.

5. The cache memory according to claim 2, wherein
a mapping scheme of the cache memory is fully associative mapping,
the memory address includes a tag in upper bits and an offset in lower bits, and
the address translator generates the cache memory address by adding additional information to the memory address specified by the access request, based on the address translation information.

6. The cache memory according to claim 5, wherein the main unit includes:
a data storage storing data on a cache line-by-cache line basis;
a tag storage storing tag information included in a memory address which is associated with the data stored in the data storage;
a line selector configured to select one or more cache lines, based on an index of the cache memory address or the additional information; and
a tag comparator/data selector configured to compare a tag included in the cache memory address and tags of the selected one or more cache lines to determine whether a cache hit has occurred, and, on a cache hit, select data based on an offset of the cache memory address.

7. A cache memory control method, comprising
receiving a memory address in a memory space specified by an external access request, the memory space being divided into a plurality of memory regions, different ranges of cache lines of a cache being associated with the different memory regions;
determining which memory region among the plurality of memory regions the received memory address belongs to;
based on the determined memory region, translating a portion of the memory address specified by the external access request or adding additional information to the memory address specified by the external access request, to generate a cache memory address;
selecting one or more cache lines of the cache according to the cache memory address; and
determining whether a cache hit has occurred, based on memory address information stored in the selected one or more cache lines.

8. The cache memory control method according to claim 7, further comprising
storing address translation information into an address translation information storage, the address translation information representing association of a range of memory addresses of each of the plurality of memory regions and a range of cache lines, wherein
generating the cache memory address includes generating the cache memory address based on the address translation information.

* * * * *